United States Patent
Koenck et al.

(10) Patent No.: US 7,620,127 B1
(45) Date of Patent: Nov. 17, 2009

(54) HIGH AVAILABILITY DIGITAL RADIO ARCHITECTURE

(75) Inventors: Steven E. Koenck, Cedar Rapids, IA (US); Joel M. Wichgers, Urbana, IA (US); Andrew M. Vesel, Indialantic, FL (US); Frank Pourahmadi, Hiawatha, IA (US); Demetri Tsamis, Cedar Rapids, IA (US); Gary E. Lehtola, Alburnett, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 644 days.

(21) Appl. No.: 11/237,638

(22) Filed: Sep. 28, 2005

(51) Int. Cl.
*H04L 27/06* (2006.01)
*H04L 5/16* (2006.01)
*H04B 1/38* (2006.01)

(52) U.S. Cl. ..................... 375/340; 375/219
(58) Field of Classification Search ............ 375/340, 375/316
See application file for complete search history.

(56) References Cited

U.S. PATENT DOCUMENTS

| | | | |
|---|---|---|---|
| 5,548,839 A * | 8/1996 | Caldwell et al. | 455/313 |
| 6,366,622 B1 * | 4/2002 | Brown et al. | 375/322 |
| 6,504,867 B1 | 1/2003 | Efstathiou | 375/227 |
| 6,836,507 B1 | 12/2004 | Gifford et al. | 375/150 |
| 2005/0053039 A1 * | 3/2005 | Dewan et al. | 370/334 |
| 2005/0208897 A1 * | 9/2005 | Lyons et al. | 455/67.11 |
| 2005/0262298 A1 * | 11/2005 | Lubbers et al. | 711/112 |
| 2007/0041487 A1 * | 2/2007 | Khanoyan | 377/48 |

* cited by examiner

*Primary Examiner*—David C Payne
*Assistant Examiner*—Brian J Stevens
(74) *Attorney, Agent, or Firm*—Daniel M. Barbieri

(57) ABSTRACT

The present invention is a high availability digital radio architecture which includes an analog interface subsystem and a baseband digital processing subsystem. The analog interface subsystem includes an antenna switching network and a digital antenna group translator. The translator includes a set of analog and digital building blocks for each communication, navigation and surveillance (CNS) waveform. The set of blocks includes a receive signal processing chain and/or a transmit signal processing chain with digital interfaces to a multi-channel transceiver. The switching network provides connectivity between antennas and the translator. The baseband digital processing system includes a network switch and said multi-channel transceiver. The transceiver includes a digital modem and protocol processing components for implementing behavior of each CNS waveform. The network switch is communicatively coupled to said translator and to said transceiver and provides interconnection between said translator and individual channels in said baseband digital processing subsystem.

14 Claims, 2 Drawing Sheets

HIGH AVAILABILITY DIGITAL RADIO ARCHITECTURE

FIELD OF THE INVENTION

The present invention generally relates to communication, navigation and surveillance (CNS) systems and particularly to a high availability commercial avionics digital radio architecture.

BACKGROUND OF THE INVENTION

Software Defined Radio (SDR) methodology is rapidly gaining favor as a way to architect and design radio communication systems with greatly improved interoperability and ability to accommodate future waveform variants. SDR refers to wireless communication in which the transmitter modulation is generated or defined by a computer, and the receiver uses a computer to recover the signal intelligence. To select the desired modulation type, the proper programs are run by microcomputers that control the transmitter and receiver. A typical voice SDR transmitter, such as may be used in mobile two-way radio or cellular telephone communication, include the following stages, where items followed by asterisks represent computer-controlled circuits whose parameters are determined by the programming (software): (1) Microphone; (2) Audio amplifier; (3) Analog-to-digital converter (ADC) that converts the voice audio to digital data *; (4) Modulator that impresses the digital intelligence onto a radio-frequency (RF) carrier *; (5) Series of amplifiers that boosts the RF carrier to the power level necessary for transmission; and (6) Transmitting antenna. A typical receiver designed to intercept the above-described voice SDR signal may employ the following stages, essentially reversing the transmitter's action, where items followed by asterisks represent programmable circuits: (1) Receiving antenna; (2) Superheterodyne system that boosts incoming RF signal strength and converts it to a lower frequency; (3) Demodulator that separates the digital intelligence from the RF carrier *; (4) Digital-to-analog converter (DAC) that generates a voice waveform from the digital data *; (5) Audio amplifier; and (6) Speaker, earphone, and/or headset. The most significant asset of SDR is versatility. Wireless systems employ protocols that vary from one service to another. Even in the same type of service, for example, cellular telephones, the protocol often differs from country to country. A single SDR set with an all-inclusive software repertoire may be used in any mode, anywhere in the world. Changing the service type, the mode, and/or the modulation protocol involves simply selecting and executing the requisite computer program. The ultimate goal of SDR engineers is to provide a single radio transceiver capable of playing the roles of cordless telephone, cell phone, wireless fax, wireless e-mail system, pager, wireless videoconferencing unit, wireless Web browser, Global Positioning System (GPS) unit, and other functions still in the realm of science fiction, operable from any location on the surface of the earth, and perhaps in space as well.

The United States Department of Defense (DoD) Joint Tactical Radio System (JTRS) initiative has established an Open Standard Architecture for implementation of military communication waveforms that is specifically intended to meet a subset of these objectives. There is growing interest in applying an Open Standard SDR Architecture to commercial applications such as avionics communication, navigation and surveillance (CNS). The characteristics of commercial CNS waveforms are quite different from the military JTRS communication waveforms, and, in general, are less complex to implement. A key difference between military communications and commercial avionics are the requirements associated with safety. The safety requirements associated with commercial CNS avionics typically involve gaining approval for use (generally referred to as "certification") by the appropriate civil aviation authority, such as the Federal Aviation Administration (FAA) in the United States or the Joint Aviation Administration (JAA) in Europe. The safety requirements for the CNS functions typically address the integrity and availability, and for some functions, the continuity. Thus, it is desirable to provide an avionics commercial CNS system architecture that addresses the safety requirements while retaining compatibility with an appropriate SDR standard, preferably the Open Standard Architecture established by the DoD as part of the JTRS program.

SUMMARY OF THE INVENTION

In a first exemplary aspect of the present invention, a high availability digital radio architecture includes an analog interface subsystem and a baseband digital processing subsystem. The analog interface subsystem includes an antenna switching network and a digital antenna group translator. The antenna switching network provides the connectivity between a plurality of antennas and a plurality of antenna blocks in the digital antenna group translator. The digital antenna group translator includes a set of analog and digital building blocks for each communication, navigation and surveillance (CNS) waveform. The set of analog and digital building blocks provides at least one of a receive signal processing chain or a transmit signal processing chain with digital interfaces to a multi-channel transceiver. The baseband digital processing subsystem includes a network switch and a multi-channel transceiver. The multi-channel transceiver includes a digital modem and protocol processing components for implementing the behavior of each CNS waveform. The network switch is communicatively coupled to the digital antenna group translator and to the multi-channel transceiver and provides a multiplexed data path for interconnection between the digital antenna group translator and individual channels in the baseband digital processing subsystem.

In an additional exemplary aspect of the present invention, a high availability digital radio architecture includes a first analog interface subsystem, a second analog interface subsystem, a first baseband digital processing subsystem, and a second baseband digital processing subsystem. The first analog interface subsystem includes a first antenna switching network and a first digital antenna group translator, the latter of which includes a first set of analog and digital building blocks for each communication, navigation and surveillance (CNS) waveform. The first set of analog and digital building blocks includes at least one of a first receive signal processing chain or a first transmit signal processing chain with digital interfaces to a first multi-channel transceiver. The second analog interface subsystem includes a second digital antenna group translator which includes a second set of analog and digital building blocks for each CNS waveform. The second set of analog and digital building blocks includes at least one of a second receive signal processing chain or a second transmit signal processing chain with digital interfaces to a second multi-channel transceiver. The first baseband digital processing subsystem includes a first network switch and the first multi-channel transceiver. The first multi-channel transceiver includes a first digital modem and a first set of protocol processing components for implementing the behavior of each CNS waveform. The first network switch is communicatively coupled to the first digital antenna group translator and to the first multi-channel transceiver and provides a multiplexed data path for interconnection between the first digital antenna group translator and individual channels in the first baseband digital processing subsystem. The second baseband digital processing subsystem includes a second network switch and the second multi-channel transceiver. The second multi-channel transceiver includes a second digital modem and a second set of protocol processing components for implementing the behavior of each CNS waveform. The second network switch is communicatively coupled to the second digital antenna group translator and to the second multi-channel transceiver and provides a multiplexed data path for interconnection between the second digital antenna group translator and individual channels in the second baseband digital processing subsystem.

In general, high availability of critical functions for safety critical avionics applications is provided by the use of two or more systems, each of which includes a complete implementation of each critical function. Such a redundant system configuration is required to be capable of providing the critical function after any single fault. Certain avionics functions such as automated landing systems are of such extreme criticality that they must be capable of continued safe operation after two separate and independent faults. In the present invention, an architecture is disclosed which may provide availability of critical functions and continued safe operation after certain instances of two separate and independent faults in a dual system configuration, and all instances of two faults in a triple (or more) system configuration. In the dual system configuration, the first digital antenna group translator is communicatively coupled to the second network switch and the second digital antenna group translator is communicatively coupled to the first network switch so that CNS functions may continue to be available after any single fault in a system component of the high availability digital radio architecture, and may continue to be available after faults occur simultaneously in a first digital antenna group translator and an opposite side baseband digital processing subsystem. In a triple (or more) system configuration, the CNS functions may continue to be available after any two subsystem faults.

In another exemplary aspect of the present invention, a method for providing a high availability digital radio architecture is disclosed. A first analog interface subsystem, a second analog interface subsystem, a first baseband digital processing subsystem, and a second baseband digital processing subsystem are provided. The first analog interface subsystem includes a first antenna switching network and a first digital antenna group translator, the latter of which includes a first set of analog and digital building blocks for each communication, navigation and surveillance (CNS) waveform. The first set of analog and digital building blocks includes at least one of a first receive signal processing chain or a first transmit signal processing chain with digital interfaces to a first multi-channel transceiver. The second analog interface subsystem includes a second antenna switching network and a second digital antenna group translator, the latter of which includes a second set of analog and digital building blocks for each CNS waveform. The second set of analog and digital building blocks includes at least one of a second receive signal processing chain or a second transmit signal processing chain with digital interfaces to a second multi-channel transceiver. The first baseband digital processing subsystem includes a first network switch and the first multi-channel transceiver. The first multi-channel transceiver includes a first digital modem and a first set of protocol processing components for implementing the behavior of each CNS waveform. The first network switch is communicatively coupled to the first digital antenna group translator and to the first multi-channel transceiver and provides interconnection between the first digital antenna group translator and individual channels in the first baseband digital processing subsystem. The second baseband digital processing subsystem includes a second network switch and the second multi-channel transceiver. The second multi-channel transceiver includes a second digital modem and a second set of protocol processing components for implementing the behavior of each CNS waveform. The second network switch is communicatively coupled to the second digital antenna group translator and to the second multi-channel transceiver and provides a multiplexed data path for interconnection between the second digital antenna group translator and individual channels in the second baseband digital processing subsystem. In the dual system configuration, the first digital antenna group translator is communicatively coupled to the second network switch and the second digital antenna group translator is communicatively coupled to the first network switch so that CNS functions may continue to be available after any single fault in a system component of the high availability digital radio architecture, and may continue to be available after faults occur simultaneously in a first digital antenna group translator and an opposite side baseband digital processing subsystem. In a triple (or more) system configuration, the CNS functions may continue to be available after any two subsystem faults.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
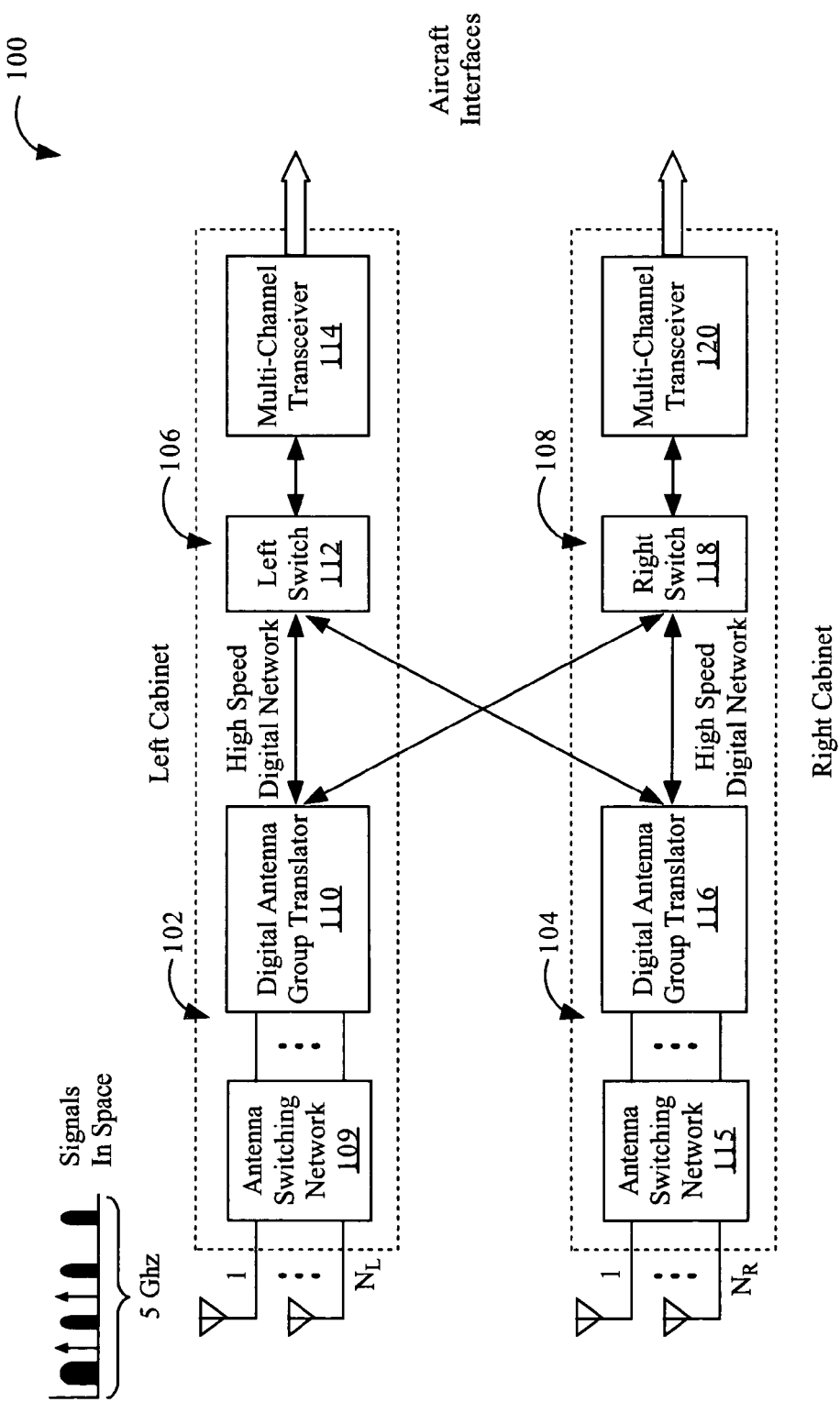
FIG. 1 is a schematic block diagram illustrating a high availability digital radio architecture in accordance with an exemplary embodiment of the present invention.

Referring to FIG. 1, a high availability digital radio architecture 100 in accordance with an exemplary embodiment of the present invention is shown. The architecture 100 may include a first analog interface subsystem 102, a second analog interface subsystem 104, a first baseband digital processing subsystem 106, and a second baseband digital processing subsystem 108. Preferably, the first analog interface subsystem 102 and the first baseband digital processing subsystem 106 are packaged in a single aircraft cabinet (e.g., left cabinet), and the second analog interface subsystem 104 and the second baseband digital processing subsystem 108 are packaged in another single aircraft cabinet (e.g., right cabinet). More than two cabinets may be provided and interconnected according to the present invention when higher availability is required.

The first analog interface subsystem 102 is an analog subsystem and includes a first antenna switching network 109 and a first digital antenna group translator 110. The first antenna switching network 109 provides the connectivity between a set of 1 to $N_L$ number of antennas and a set of 1 to $M_L$ number of antenna blocks in the first digital antenna group translator 110. The first digital antenna group translator 110 includes a first set of analog and digital building blocks (not shown in FIG. 1, but see FIG. 2 where an exemplary embodiment of the first digital antenna group translator 110 is shown) for each communication, navigation and surveillance (CNS) waveform. The first set of analog and digital building blocks may include complete receive and transmit (if required) capability with digital interfaces to a first multi-channel transceiver 114. Preferably, the first set of analog and digital building blocks includes at least one of a first receive signal processing chain or a first transmit signal processing chain with digital interfaces, through first and second network switches 112 and 118, to both first and second multi-channel transceivers 114 and 120. Similarly, the second analog interface subsystem 104 is an analog subsystem and includes a second antenna switching network 115 and a second digital antenna group translator 116. The second antenna switching network 115 provides the connectivity between a set of 1 to $N_R$ number of antennas and a set of 1 and $M_R$ number of antenna blocks in the second digital antenna group translator 116. The second digital antenna group translator 116 includes a second set of analog and digital building blocks (not shown in FIG. 1, but see FIG. 2 where an exemplary embodiment of the second digital antenna group translator 116 is shown) for each CNS waveform. The second set of analog and digital building blocks may include complete receive and transmit (if required) capability with digital interfaces, through the first and second network switches 112 and 118, to both the first and second multi-channel transceivers 114 and 120. Preferably, the second set of analog and digital building blocks includes at least one of a second receive signal processing chain or a second transmit signal processing chain with digital interfaces, through the first and second network switches 112 and 118, to both the first and second multi-channel transceivers 114 and 120.

The first baseband digital processing subsystem 106 is a digital subsystem and includes the first network switch 112 and the first multi-channel transceiver 114. The first multi-channel transceiver 114 includes a first digital modem (not shown) and a first set of protocol processing components (not shown) for implementing the behavior of each CNS waveform. The first network switch 112 is communicatively coupled to the first digital antenna group translator 110 and to the first multi-channel transceiver 114 and provides a multiplexed data path for interconnection between the first digital antenna group translator 110 and individual channels in the first baseband digital processing subsystem 106. Similarly, the second baseband digital processing subsystem 108 is a digital subsystem and includes the second network switch 118 and the second multi-channel transceiver 120. The second multi-channel transceiver 120 includes a second digital modem (not shown) and a second set of protocol processing components (not shown) for implementing the behavior of each CNS waveform. The second network switch 118 is communicatively coupled to the second digital antenna group translator 116 and to the second multi-channel transceiver 120 and provides a multiplexed data path for interconnection between the second digital antenna group translator 104 and individual channels in the second baseband digital processing subsystem 108. Preferably, the first digital antenna group translator 110 is communicatively coupled to the second network switch 118 and the second digital antenna group translator 116 is communicatively coupled to the first network switch 112 so that CNS functions may continue to be available after any single fault in a system component of the high availability digital radio architecture 100.

In a preferred dual system configuration, the first digital antenna group translator 110 is communicatively coupled to the second network switch 118 and the second digital antenna group translator 116 is communicatively coupled to the first network switch 112 so that CNS functions may continue to be available after any single fault in a system component of the high availability digital radio architecture 100, and may continue to be available after faults occur simultaneously in a digital antenna group translator and an opposite side baseband digital processing subsystem. By way of example, faults may occur simultaneously in both the digital antenna group translator 110 and the multi-channel transceiver 120, with continued operation of the digital antenna group translator 116 and the multi-channel transceiver 114 such that the function may still be available. In a triple (or more) system configuration (not shown), the CNS functions may continue to be available after any two subsystem faults.

The foregoing-described dual system configuration radio architecture may be implemented with redundancy (dual or more) within at least one of the first or second analog interface subsystems 102 and 104 or within the first or second baseband digital processing subsystems 106 and 108. Such a configuration (referred to as an internally redundant dual configuration) may have substantially higher fault-tolerance than that of the dual system configuration described above. This alternative internally redundant dual configuration is a higher availability radio architecture than the foregoing-described dual system configuration without internal redundancy.

Preferably, for each waveform module, the first receive signal processing chain in the first digital antenna group translator 110 and the second receive signal processing chain in the second digital antenna group translator 116 are each suitable for functioning as a tuner to downconvert a signal and convert the signal to a digital data stream that may be interfaced to the multi-channel transceivers 114, 120 over a high speed digital network. The first digital modem in the first multi-channel transceiver 114 or the second digital modem in the second multi-channel transceiver 120 may receive the digital sampled data stream and process it according to the waveform requirements. Preferably, the high speed digital network is 10 Gbps Ethernet with fiber optic media to minimize EMC (electromagnetic compatibility) effects.

Preferably, the first transmit signal processing chain in the first digital antenna group translator 110 and the second transmit signal processing chain in the second digital antenna group translator 116 are each suitable for receiving a digital data stream from the first digital modem in the first multi-channel transceiver 114 or the second digital modem in the second multi-channel transceiver 120, converting the digital data stream into a baseband analog signal through a D/A (digital-to-analog) converter, upconverting the baseband analog signal to a signal at a selected carrier frequency, and amplifying the signal at the selected carrier frequency through a power amplifier (PA).

Figure 2:
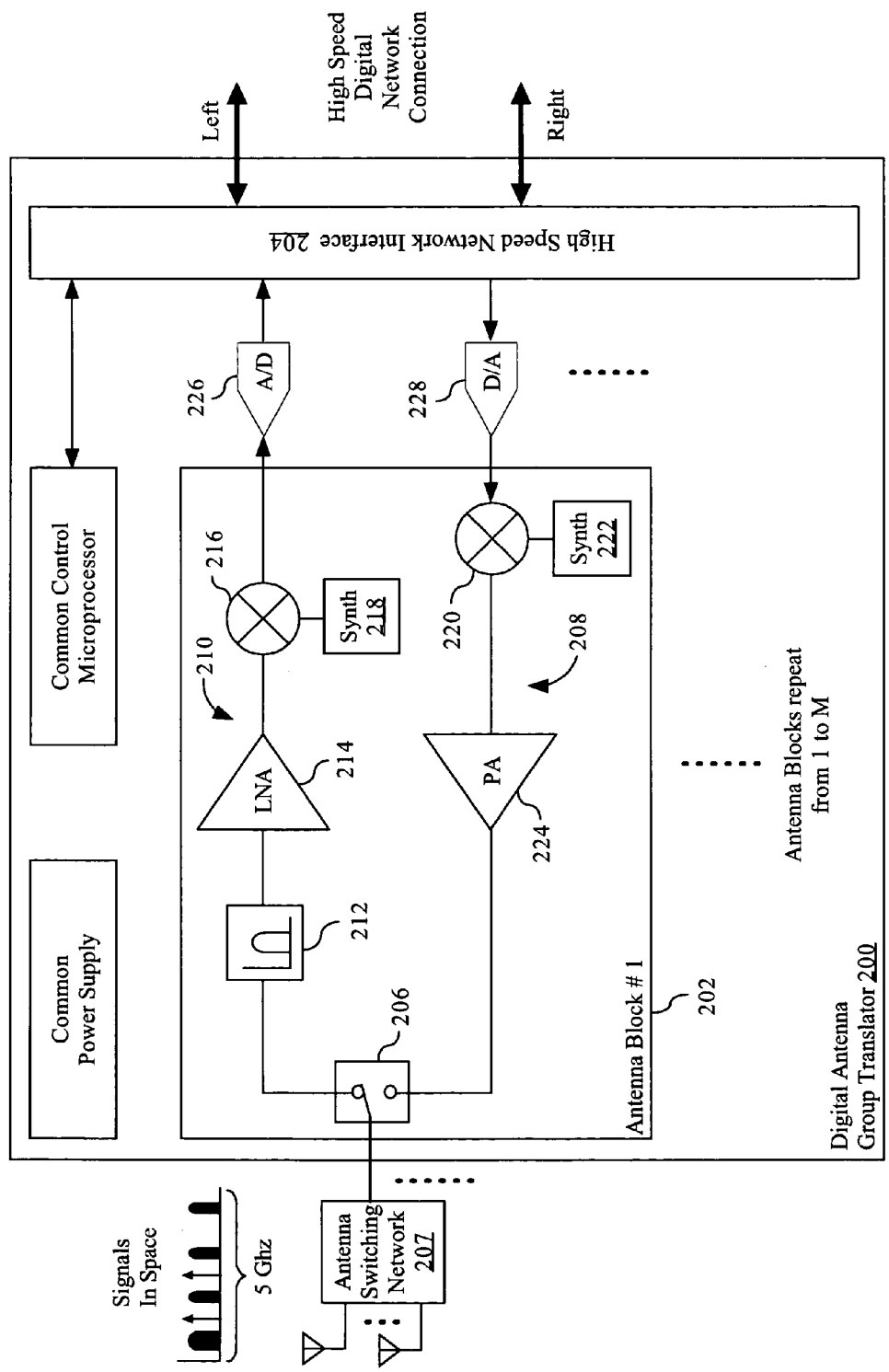
FIG. 2 is a schematic block diagram illustrating a digital antenna group translator in accordance with an exemplary embodiment of the present invention.

FIG. 2 is a schematic block diagram illustrating a digital antenna group translator 200 in accordance with an exemplary embodiment of the present invention. In a preferred embodiment, the digital antenna group translator 200 may be used as the first digital antenna group translator 110 and/or the second digital antenna group translator 116 shown in FIG. 1. An antenna switching network 207 may provide the connectivity between a plurality of antennas and a plurality of antenna blocks 202 in the digital antenna group translator 200. The digital antenna group translator 200 may include one or more antenna blocks 202 and a high speed network interface 204 communicatively coupled to the high speed digital network shown in FIG. 1. Each antenna block 202 may include a transmit/receive (TX/RX) switch 206, a transmit path 208 communicatively coupled to the TX/RX switch 206, and a receive path 210 communicatively coupled to the TX/RX switch 206. The receive path 210 includes a filter 212, a low noise amplifier (LNA) 214, and a first mixer 216 coupled to a first synthesizer 218. The transmit path 208 includes a second mixer 220 coupled to a synthesizer 222, and a power amplifier 224. An A/D (analog-to-digital) converter 226 is communicatively coupled to the receive path 210 and to the high speed network interface 204. An D/A converter 228 is communicatively coupled to the transmit path 208 and to the high speed network interface 204.

According to the present invention, since multiple cabinets may be cross connected to provide dual or triple redundancy, the present architecture makes it possible for CNS functions to continue to be available after any single or double fault in system components. Thus, the present invention, if applied in the avionics commercial CNS system, can address the safety concern.

In an alternate embodiment of the present invention (not shown), the interfaces between the digital antenna group translators and multi-channel transceivers are implemented using a broadband analog interconnecting network rather than a high speed digital network. In this alternate configuration, the D/A 226 and A/D 228 converter functions illustrated in FIG. 2 as part of the digital antenna group translator (labeled 110 and 116 for the left and right cabinets, respectively, in FIG. 1) are moved to the multi-channel transceiver functions (labeled 114 and 120 for the left and right cabinets, respectively, in FIG. 1). The high speed digital network is replaced by an analog interface where the transmit and receive baseband signals are frequency division multiplexed between the digital antenna group translators and the multi-channel transceivers. The left and right network switches 112 and 118, respectively, are analog circuit switches that select a source and switch it to the destination. The D/A 226 and A/D 228 converter functions preferably receive and transmit the frequency division multiplexed analog signals to be multiplexed and demultiplexed using digital signal processing techniques well known in the art.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A high availability digital radio architecture, comprising:

a first analog interface subsystem including a first antenna switching network and a first digital antenna group translator, said first digital antenna group translator including a first set of analog and digital building blocks for each communication, navigation and surveillance (CNS) waveform, said first set of analog and digital building blocks including at least one of a first receive signal processing chain or a first transmit signal processing chain with digital interfaces to a first multi-channel transceiver, said first antenna switching network providing connectivity between a first plurality of antennas and said first digital antenna group translator;

a second analog interface subsystem including a second antenna switching network and a second digital antenna group translator, said second digital antenna group translator including a second set of analog and digital building blocks for said each CNS waveform, said second set of analog and digital building blocks including at least one of a second receive signal processing chain or a second transmit signal processing chain with digital interfaces to a second multi-channel transceiver, said second antenna switching network providing connectivity between a second plurality of antennas and said second digital antenna group translator;

a first baseband digital processing subsystem including a first network switch and said first multi-channel transceiver, said first multi-channel transceiver including a first digital modem and a first set of protocol processing components for implementing behavior of said each CNS waveform, said first network switch being communicatively coupled to said first digital antenna group translator and to said first multi-channel transceiver and providing a multiplexed data path for interconnection between said first digital antenna group translator and individual channels in said first baseband digital processing subsystem; and a second baseband digital processing subsystem including a second network switch and said second multi-channel transceiver, said second multi-channel transceiver including a second digital modem and a second set of protocol processing components for implementing behavior of said each CNS waveform, said second network switch being communicatively coupled to said second digital antenna group translator and to said second multi-channel transceiver and providing interconnection between said second digital antenna group translator and individual channels in said second baseband digital processing subsystem, wherein said first digital antenna group translator is communicatively coupled to said second network switch and said second digital antenna group translator is communicatively coupled to said first network switch so that CNS functions continue to be available after a single fault in a system component of said high availability digital radio architecture.

2. The high availability digital radio architecture of claim 1, wherein at least one of said first receive signal processing chain or said second receive signal processing chain for each waveform module is suitable for functioning as a tuner to downconvert a signal and convert said signal to a first digital data stream to be interfaced to at least one of said first multi-channel transceiver or said second multi-channel transceiver over a high speed digital network.

3. The high availability digital radio architecture of claim 2, wherein said high speed digital network communicates at least at 1 Gbps.

4. The high availability digital radio architecture of claim 2, wherein said high speed digital network uses fiber optic media.

5. The high availability digital radio architecture of claim 2, wherein at least one of said first transmit signal processing chain or said second transmit signal processing chain for said each waveform module is suitable for receiving a second digital data stream from at least one of said first digital modem or said second digital modem, converting said second digital data stream into a baseband analog signal, upconverting said baseband analog signal to a signal at a selected carrier frequency, and amplifying said signal at said selected carrier frequency.

6. The high availability digital radio architecture of claim 5, wherein each of said first digital antenna group translator and said second digital antenna group translator comprises:
 at least one antenna block, each of said at least one antenna block including a transmit/receive switch, a transmit path communicatively coupled to said transmit/receive switch, and a receive path communicatively coupled to said transmit/receive switch;
 a high speed network interface communicatively coupled to said high speed digital network;
 an A/D converter communicatively coupled to said receive path and to said high speed network interface; and
 an D/A converter communicatively coupled to said transmit path and to said high speed network interface.

7. The high availability digital radio architecture of claim 6, wherein said receive path includes a filter, a low noise amplifier, and a mixer coupled to a synthesizer.

8. The high availability digital radio architecture of claim 6, wherein said transmit path includes a mixer coupled to a synthesizer, and a power amplifier.

9. The high availability digital radio architecture of claim 1, wherein said first analog interface subsystem and said first baseband digital processing subsystem are packaged in a single aircraft cabinet.

10. The high availability digital radio architecture of claim 1, wherein said second analog interface subsystem and said second baseband digital processing subsystem are packaged in a single aircraft cabinet.

11. The high availability digital radio architecture of claim 1, wherein said second analog interface subsystem and said second baseband digital processing subsystem are physically separated.

12. A method for implementing high availability digital radio architecture, comprising:
 providing a first analog interface subsystem including a first antenna switching network and a first digital antenna group translator, said first digital antenna group translator including a first set of analog and digital building blocks for each communication, navigation and surveillance (CNS) waveform, said first set of analog and digital building blocks including at least one of a first receive signal processing chain or a second transmit signal processing chain with digital interfaces to a first multi-channel transceiver, said first antenna switching network providing connectivity between a first plurality of antennas and said first digital antenna group translator;
 providing a second analog interface subsystem including a second antenna switching network and a second digital antenna group translator, said second digital antenna group translator including a second set of analog and digital building blocks for said each CNS waveform, said second set of analog and digital building blocks including at least one of a second receive signal processing chain or a second transmit signal processing chain with digital interfaces to a second multi-channel transceiver, said second antenna switching network providing connectivity between a second plurality of antennas and said second digital antenna group translator;
 providing a first baseband digital processing subsystem including a first network switch and said first multi-channel transceiver, said first multi-channel transceiver including a first digital modem and a first set of protocol processing components for implementing behavior of said each CNS waveform, said first network switch being communicatively coupled to said first digital antenna group translator and to said first multi-channel transceiver and providing a multiplexed data path for interconnection between said first digital antenna group translator and individual channels in said first baseband digital processing subsystem;
 providing a second baseband digital processing subsystem including a second network switch and said second multi-channel transceiver, said second multi-channel transceiver including a second digital modem and a second set of protocol processing components for implementing behavior of said each CNS waveform, said second network switch being communicatively coupled to said second digital antenna group translator and to said second multi-channel transceiver and providing interconnection between said second digital antenna group translator and individual channels in said second baseband digital processing subsystem; and
 communicatively coupling said first digital antenna group translator to said second network switch and said second digital antenna group translator to said first network switch so that CNS functions continue to be available after a single fault in a system component of said high availability digital radio architecture.

13. The method of claim 12, wherein at least one of said first receive signal processing chain or said second receive signal processing chain for each waveform module is suitable for functioning as a tuner to downconvert a signal and convert said signal to a first digital data stream to be interfaced to at least one of said first multi-channel transceiver or said second multi-channel transceiver over a high speed digital network.

14. The method of claim 13, wherein at least one of said first transmit signal processing chain or said second transmit signal processing chain for said each waveform module is suitable for receiving a second digital data stream from at least one of said first digital modem or said second digital modem, converting said second digital data stream into a baseband analog signal, upconverting said baseband analog signal to a signal at a selected carrier frequency, and amplifying said signal at said selected carrier frequency.

* * * * *